United States Patent
Li et al.

(10) Patent No.: US 9,432,266 B2
(45) Date of Patent: Aug. 30, 2016

(54) QOS THROTTLING FOR MOBILE DEVICES

(75) Inventors: Xiangyang Li, Shanghai (CN); Yigang Cai, Naperville, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 318 days.

(21) Appl. No.: 13/637,767

(22) PCT Filed: Apr. 1, 2010

(86) PCT No.: PCT/CN2010/071496
§ 371 (c)(1),
(2), (4) Date: Sep. 27, 2012

(87) PCT Pub. No.: WO2011/120229
PCT Pub. Date: Oct. 6, 2011

(65) Prior Publication Data
US 2013/0016624 A1   Jan. 17, 2013

(51) Int. Cl.
*H04L 12/26* (2006.01)
*G06F 15/16* (2006.01)
(Continued)

(52) U.S. Cl.
CPC ........ *H04L 41/5009* (2013.01); *H04L 41/5025* (2013.01); *H04L 43/0876* (2013.01);
(Continued)

(58) Field of Classification Search
CPC ........... H04W 4/24; H04W 4/26; H04W 8/02; H04M 15/80; H04M 15/00; H04M 15/41; H04M 15/8016; H04M 15/58; H04L 12/14; H04L 41/5003; H04L 12/1403; H04L 12/1482
USPC ......... 370/252, 458, 468, 445, 335, 447, 448, 370/441, 477, 225
See application file for complete search history.

(56) References Cited

U.S. PATENT DOCUMENTS 6,618,591 B1 * 9/2003 Kalliokulju ........... H04L 1/0002
370/468
7,764,947 B2 * 7/2010 Koskinen ............... H04M 15/31
455/405
(Continued)

FOREIGN PATENT DOCUMENTS

CN    101370263 A    2/2009
JP    2001-36671     2/2001
(Continued)

OTHER PUBLICATIONS

Author: Stephen (www.berryreporter.com); Title: T-Mobile's 3G Speed Reduction Cap; Date: Sep. 23, 2008.*
(Continued)

*Primary Examiner* — Charles C Jiang
*Assistant Examiner* — Will Lin
(74) *Attorney, Agent, or Firm* — Fay Sharpe LLP

(57) ABSTRACT

Communication networks and methods are disclosed for performing Quality of Service (QoS) throttling for mobile devices. One embodiment comprises a network element that serves a mobile device for data services. The network element includes a control system that monitors usage of the mobile device that is accessing the data services. The network element further includes a policy system that identifies that the usage of the mobile device reaches a usage threshold, and determines a reduced QoS responsive to reaching the usage threshold. The control system then downgrades the QoS provided to the mobile device for data services based on the reduced QoS. The policy system may further send a notification to the mobile device that the QoS is reduced.

20 Claims, 6 Drawing Sheets

(51) Int. Cl.
*H04M 1/00* (2006.01)
*H04L 12/24* (2006.01)
*H04L 12/833* (2013.01)
*H04L 29/08* (2006.01)
*G06Q 10/00* (2012.01)
*H04L 12/801* (2013.01)
*H04L 12/813* (2013.01)
*H04L 12/851* (2013.01)
*H04M 15/00* (2006.01)

(52) U.S. Cl.
CPC .......... *H04L43/16* (2013.01); *H04L 47/2458* (2013.01); *H04L 67/22* (2013.01); *H04L 67/322* (2013.01); *H04L 47/14* (2013.01); *H04L 47/20* (2013.01); *H04L 47/2408* (2013.01); *H04L 47/29* (2013.01); *H04M 15/8016* (2013.01); *H04M 15/8083* (2013.01)

(56) References Cited

U.S. PATENT DOCUMENTS

| | | | | |
|---|---|---|---|---|
| 8,112,062 B2* | 2/2012 | Pattabiraman | ......... | H04L 12/14 379/114.17 |
| 8,219,449 B2* | 7/2012 | Bertin | ............... | G06Q 20/20 340/10.1 |
| 8,589,541 B2* | 11/2013 | Raleigh | ............... | H04L 41/0893 455/405 |
| 8,606,911 B2* | 12/2013 | Raleigh | ............... | H04L 12/14 707/694 |
| 2006/0141983 A1* | 6/2006 | Jagannathan | ...... | G06Q 30/0283 455/406 |
| 2008/0183604 A1* | 7/2008 | Chou | ............... | G06Q 50/32 705/30 |
| 2010/0010922 A1* | 1/2010 | Foottit | ............... | G06Q 10/00 705/30 |
| 2011/0065435 A1* | 3/2011 | Pancorbo Marcos | ............... | H04W 76/041 455/436 |
| 2011/0238547 A1* | 9/2011 | Belling | ............... | G06Q 30/04 705/34 |
| 2012/0117235 A1* | 5/2012 | Castro Castro | ......... | H04L 12/14 709/224 |
| 2012/0202457 A1* | 8/2012 | Yang | ............... | H04L 12/5695 455/406 |
| 2014/0113583 A1* | 4/2014 | Raleigh | ............ | G06Q 10/06375 455/405 |

FOREIGN PATENT DOCUMENTS

| | | |
|---|---|---|
| JP | 2002-344666 | 11/2002 |
| JP | 2004-274416 | 9/2004 |
| JP | 2007-36805 | 2/2007 |
| JP | 2009-284011 | 12/2009 |

OTHER PUBLICATIONS

3rd Generation Partnership Project: "Technical Specification Group Services and System Aspects; Policy and charging control architecture (Release 9)," 3GPP TS 23.203 V9.4.0, pp. 1-123, Mar. 2010.
"Notice of Reason for Refusal," corresponding Japanese Application No. 2013-501589, dated Dec. 3, 2013, 6 pages.

* cited by examiner

QOS THROTTLING FOR MOBILE DEVICES

FIELD OF THE INVENTION

The invention is related to the field of communication networks and, in particular, to providing Quality of Service (QoS) throttling for mobile devices.

BACKGROUND

Service providers typically provide numerous voice and data services to subscribers using wireline and/or wireless communication networks. Examples of voice services are voice calls, call forwarding, call waiting, etc. Examples of data services are streaming audio, streaming video, Voice over IP (VoIP), online gaming, and IP-TV. Mobile devices, such as cell phones, personal data assistants, smart phones, notebook computers, etc, may access the services provided by the communication networks over an air interface with one or more base stations. Communication between the mobile devices and base stations is governed by various standards and/or protocols, such as the standards and protocols defined by the 3rd Generation Partnership Project (3GPP, 3GPP2).

End users of mobile devices are more likely to engage in long duration sessions when accessing data services as opposed to voice services. For example, an end user is more likely to stream video or engage in an online game for an hour or more, than to be on a voice call for an hour or more. If an end user engages is long duration sessions over a billing period (e.g., a month), the end user may receive a bill that was much more than expected.

New regulations have emerged to protect end users from "bill shock" when it comes to data services. The regulation suggests a financial or volume cap set for an end user during a time period. For example, a financial cap for data services may be $50/month, while a volume cap for data services may be 10 Gigabytes/month. With the cap is set, if a percentage of the cap is reached (e.g., 80%), then a warning is played to the end user. If the cap is actually reached during a time period, then data services are terminated to the end user. This regulation helps end users from receiving a very large bill at the end of the month.

SUMMARY

Embodiments described herein provide another measure of protection against "bill shock". The usage of a mobile device is monitored while the end user accesses data services. If a usage threshold is reached, then the Quality of Service (QoS) provided to the end user is downgraded. For example, the downstream bit rate available to an end user may be reduced from 10 Mbps to 640 kbps. The reduction in QoS may deter the end user from further data sessions, and the end user may not reach the usage cap that is set. This advantageously avoids the situation where data services are terminated completely to the end user.

One embodiment comprises a network element that serves a mobile device for data services. The network element includes a control system operable to monitor usage of the mobile device that is accessing the data services. The network element further includes a policy system operable to identify that the usage of the mobile device reaches a usage threshold, and to determine a reduced QoS responsive to reaching the usage threshold. The control system is further operable to downgrade the QoS provided to the mobile device for data services based on the reduced QoS. The policy system may be further operable to send a notification to the mobile device that the QoS is reduced.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
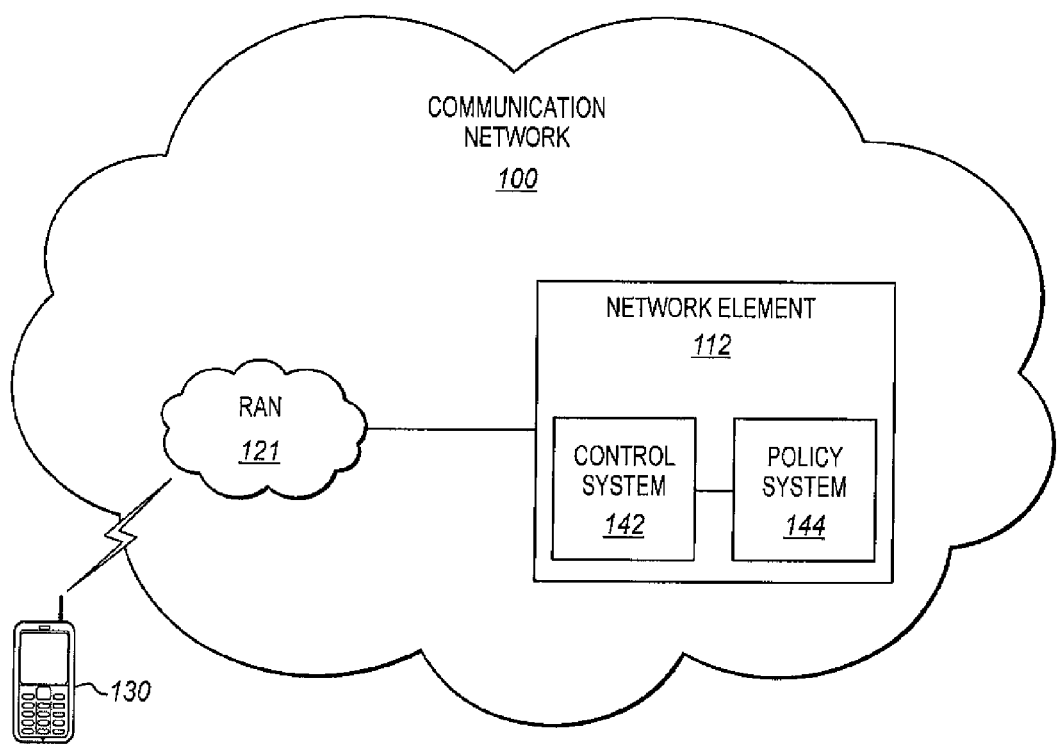
FIG. 1 illustrates a communication network in an exemplary embodiment.

FIG. 1 illustrates a communication network 100 in an exemplary embodiment. Communication network 100 may be a packet-switched network, a circuit-switched network, an IMS network, or another type of 3GPP network. Network 100 includes a network element 112, which comprises any system, server, or function operable to provide session control or provide a service for a session in network 100. For instance, if network 100 comprises a Long Term Evolution/Evolved Packet Core (LTE/EPC) network, then examples of network element 112 may be a packet data network gateway (PDN-GW), a Policy and Charging Control Function (PCCF), etc. Network element 112 includes a control system 142 and a policy system 144. Although the functionality described below is for a single network element 112, this is for illustrative purposes only. The actual functionality may be distributed over multiple network elements not shown in network 100.

A mobile device 130 is able to access voice services, data services, etc, that are provided by network 100. Some examples of data services provided by network 100 are streaming audio, streaming video, Voice over IP (VoIP), online gaming, and IP-TV. Mobile device 130 accesses network 100 through a radio access network (RAN) 121. RAN 121 comprises a wireless network (e.g., cellular network, WiFi network, etc) that provides mobile device 130 access to network 100 through wireless signals. In this embodiment, mobile device 130 may be communicating with a home network, or may be roaming in a visited network.

Embodiments provided herein allow for Quality of Service (QoS) throttling while an end user is accessing data services through network 100. QoS refers to a certain level of performance for a data flow that is provided or guaranteed by a network under the subscription of the end user. For example, the level of performance may include a bit rate, delay, jitter, packet dropping probability, and/or bit error rate. QoS throttling thus refers to reducing or downgrading the QoS provided or guaranteed to a mobile device of an end user when usage of the mobile device reaches one or more usage thresholds. The reduction of QoS does not represent termination of the service, but a downgrade of QoS from a higher level to a lower level. QoS throttling may be performed one or more times until a usage cap is reached by the mobile device, which results in the data services to the mobile device being terminated.

In FIG. 1, assume that mobile device 130 registers with network 100 in order to receive services from network 100. At some point, mobile device 130 requests sessions or services that include data flows. For example, mobile device 130 may request a streaming audio session, a streaming video session, a VoIP session, an online gaming session, an IP-TV session, etc., each of which involves a flow of packets referred to as a data flow. These types of sessions and services are referred to generally as data services.

Figure 2:
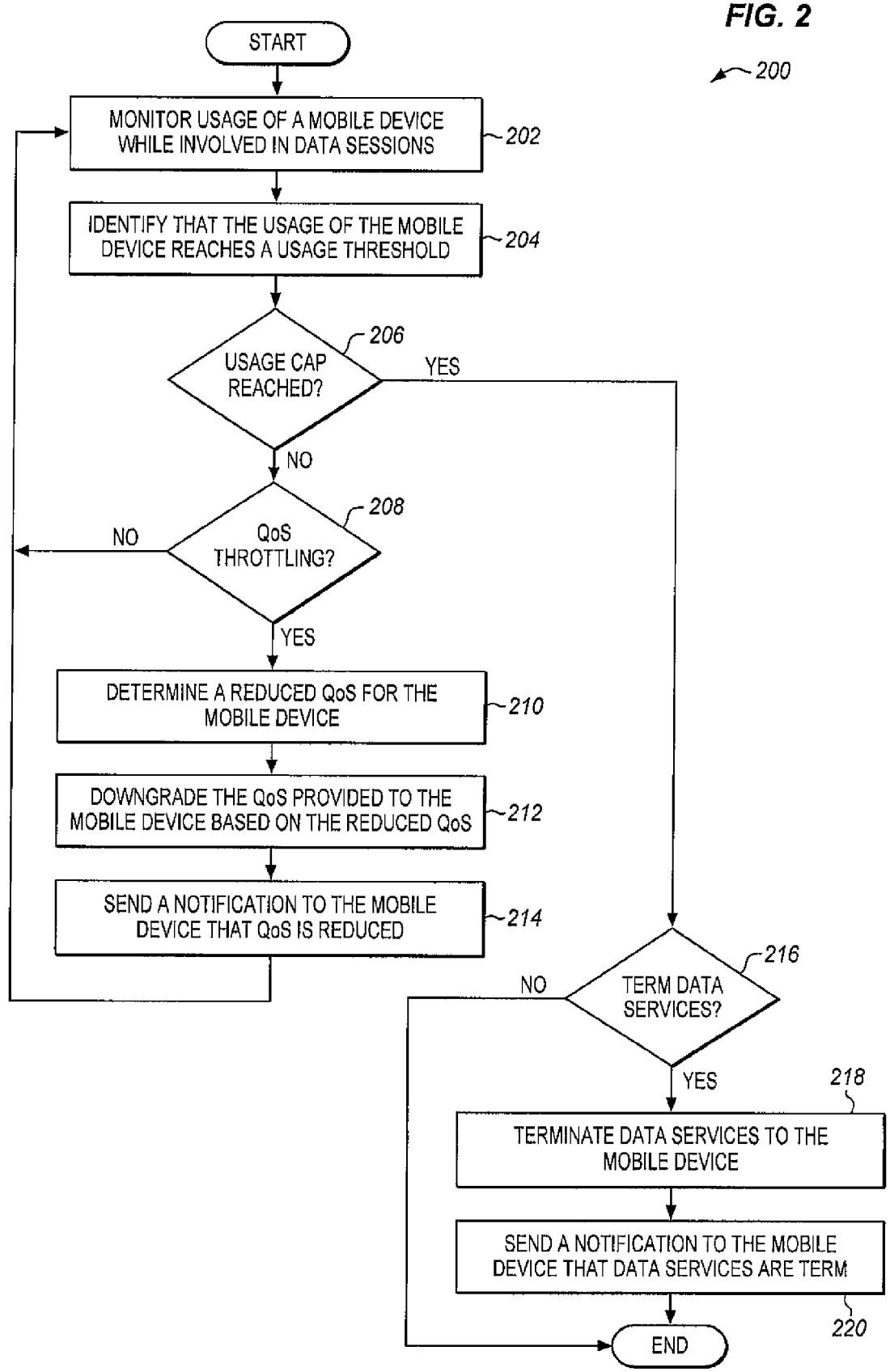
FIG. 2 is a flow chart illustrating a method of performing QoS throttling in an exemplary embodiment.

FIG. 2 is a flow chart illustrating a method 200 of performing QoS throttling in an exemplary embodiment. The steps of method 200 will be described with reference to communication network 100 in FIG. 1, although method 200 may be performed in other networks or systems. The steps of the flow chart described herein is not all inclusive and may include other steps not shown. The steps may also be performed in an alternative order.

In step 202, a control system 142 of network element 112 monitors usage of mobile device 130 while it is involved in one or more data sessions at an initial QoS. The usage of mobile device 130 may be volume-based (e.g., Gigabytes), may be financial based (e.g., dollars or some other monetary unit), or may be some other type of usage. Control system 142 reports the usage of mobile device 130 to policy system 144. The reports may be periodic or responsive to some type of triggering event.

In step 204, policy system 144 identifies that the usage of mobile device 130 reaches a usage threshold. One assumption is that one or more usage thresholds have been defined for mobile device 130, and that a usage cap has been defined for mobile device 130. For example, if usage is volume based, then a usage threshold of 8 Gigabytes and a usage cap of 10 Gigabytes may be defined for mobile device 130 during a time period (e.g., 1 month) or for a particular service. If usage is financial based, then a usage threshold of $40 and a usage cap of $50 may be defined for mobile device 130 during the time period or for a particular service.

If the usage threshold is not the usage cap (see step 206), then the flow continues to step 208 where policy system 144 determines whether to perform QoS throttling. The determination of whether to perform QoS throttling may be performed based on policies defined for mobile device 130 or for network 100 that are stored in policy system 144. For example, the determination for QoS throttling may be based on a subscriber profile and charging rules for the end user of mobile device 130. The determination for QoS throttling may be based on dynamic interaction with the end user (e.g., the end user may request that the QoS remain the same). The determination for QoS throttling may be based on an end user ID or history data for the end user (e.g., the end user has been a good customer). The determination for QoS throttling may be based on a data service type (e.g., IP-TV, online gaming, etc), a data tariff type, a data volume remaining (e.g., if a download nears the end, the download may be allowed to finish without QoS throttling), or a condition of the network (e.g., implement QoS throttling during peak time and withhold QoS throttling during off-peak time).

If the determination is not to perform QoS throttling in step 208, then policy system 144 does not change the QoS for mobile device 130 and control system 142 continues to monitor usage by mobile device 130 (return to step 202). If the determination in step 208 is to perform QoS throttling, then policy system 144 determines a reduced QoS for mobile device 130 in step 210. The amount that the QoS is reduced may vary depending on desired implementations. For example, if the end user of mobile device 130 subscribes to a "Level 3" service, then the QoS may be reduced to a "Level 2" service. In another example, if the end user of mobile device 130 is guaranteed a downstream bit rate of x, then the QoS may be reduced so that the downstream bit rate is x/2, x/5, x/10, etc. Policy system 144 then reports the reduced QoS to control system 142. In step 212, control system 142 downgrades the QoS provided to mobile device 130 for data services based on the reduced QoS.

In addition to reducing the QoS, policy system 144 may send a notification to mobile device 130 that the QoS is reduced in step 214. The notification may further indicate how much the QoS is reduced. The notification may be an SMS message, an MMS message, an email, etc. Step 214 is optional and may be performed after the QoS is downgraded in step 212 (as shown in FIG. 2), or may be performed before the QoS is downgraded in step 212. The flow then returns to step 202 where control system 142 continues to monitor usage by mobile device 130.

Control system 142 again reports the usage of mobile device 130 to policy system 144. Based on the reported usage, policy system 144 may identify that another usage threshold is reached in step 204. If the usage threshold again is not the usage cap (see step 206), then the flow continues to step 208 where policy system 144 determines whether to perform QoS throttling yet again. If the determination is not to perform QoS throttling, then policy system 144 does not change the QoS for mobile device 130 and control system 142 continues to monitor usage by mobile device 130 (return to step 202). If the determination is to perform QoS throttling, then policy system 144 determines an additionally reduced QoS for mobile device 130 in step 210. Control system 142 then downgrades the QoS for mobile device 130 again based on the additionally reduced QoS in step 212. Policy system 144 may also send another notification to mobile device 130 that the QoS is reduced again in step 214. The flow then returns to step 202 where control system 142 continues to monitor usage by mobile device 130. The process of monitoring usage and determining whether to perform QoS throttling may be performed a number of times based on how many usage thresholds have been defined for mobile device 130.

As control system 142 reports usage to policy system 144, policy system 144 may identify that another usage threshold is reached which represents the usage cap (see step 206). When this occurs, the flow continues to step 216 where policy system 144 determines whether to terminate data services to mobile device 130. The determination of whether to terminate data services may be performed based on policies defined for mobile device 130 or for network 100, some of which were described above. In addition, the determination whether to terminate data services may be based on whether or not the end user is roaming in a visited network, the location of the end user, a type of network access used by mobile device 130 (e.g., WiFi, cellular, etc), switching between prepaid and postpaid charging, and a grace period defined for the end user.

If the determination is not to terminate data services to mobile device 130, then method 200 ends (or control system 142 may continue to monitor usage in step 202). If the determination is to terminate data services, then control system 142 terminates or discontinues data services to mobile device 130 in step 218. This means that mobile device 130 is no longer able to receive data services from network 100. Mobile device 130 may still be able to place/receive voice calls, send/receive text messages, etc, but services that require data flows are no longer available to mobile device 130. The termination of data services may last until the next billing period.

In addition to terminating data services to mobile device 130, policy system 144 may send a notification to mobile device 130 that data services are terminated in step 220. Again, the notification may be an SMS message, an MMS message, an email, etc. Step 220 is optional and may be performed after the data services are terminated in step 218 (as shown in FIG. 2), or may be performed before data services are terminated in step 218. Method 200 then ends.

By throttling QoS to mobile device 130 before the usage cap is reached, network 100 discourages the end user of mobile device 130 from using the data services. For example, if the end user is involved in an online game, then the reduced QoS may make the online game undesirable to play. Thus, if the end user does not access the data services as frequently due to the reduced QoS, there is higher likelihood that the end user will not reach the usage cap and that data services will not be terminated. End users may get frustrated with a service provider if data services are terminated, so it would be advantageous to avoid situations where the services are terminated whenever possible.

Example

Figure 3:
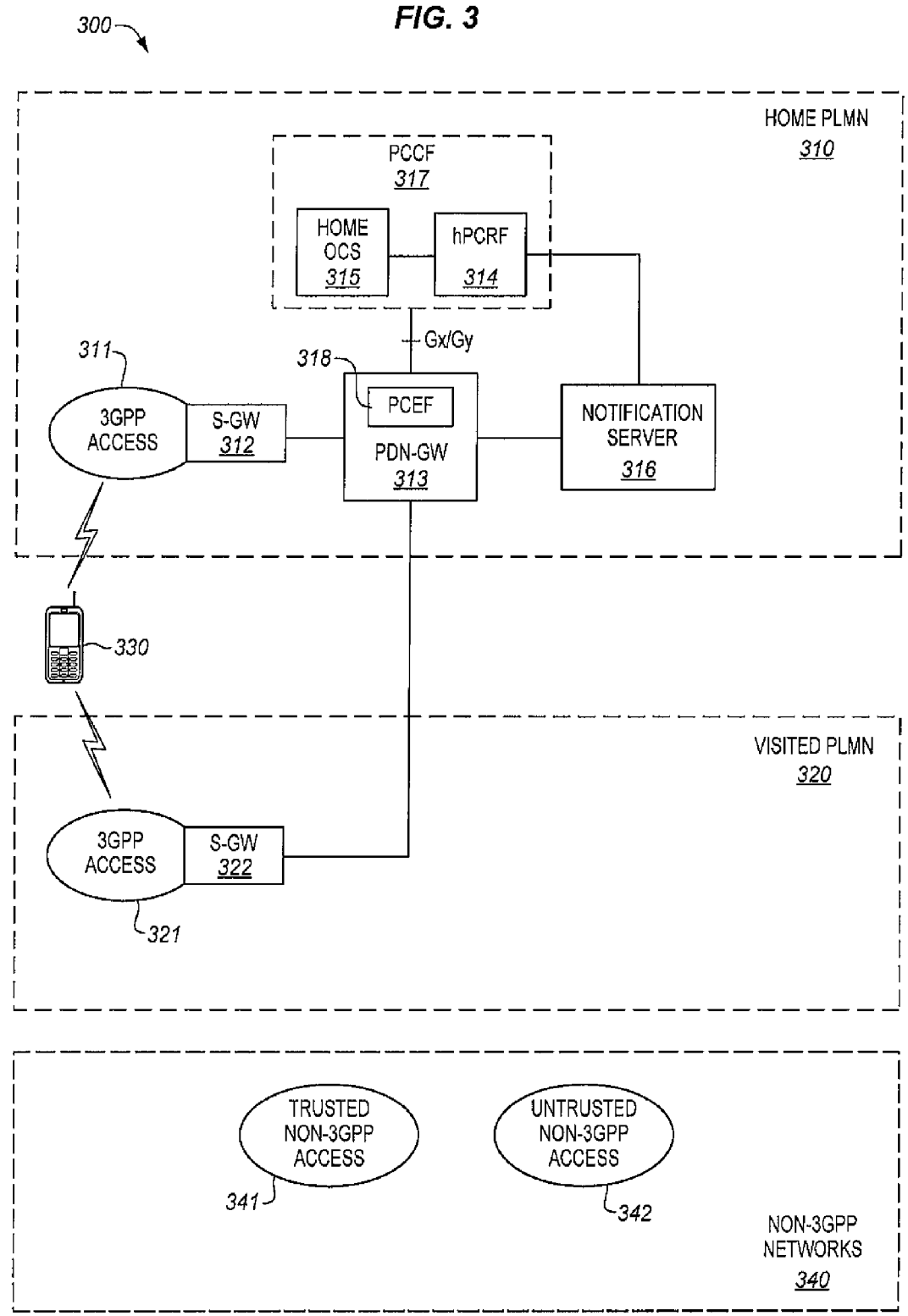
FIG. 3 illustrates an LTE/EPC network in an exemplary embodiment.

FIGS. 3-6 illustrate an example of an LTE/EPC network implementing QoS throttling. FIG. 3 illustrates an LTE/EPC network 300 in an exemplary embodiment. LTE/EPC network 300 includes a home Public Land Mobile Network (PLMN) 310, a visited PLMN 320, and one or more non-3GPP networks 340. Home PLMN 310 represents the network where an end user of a mobile device 330 has subscribed to a service plan. Home PLMN 310 includes a 3GPP access network 311, a serving gateway (S-GW) 312, a packet data network gateway (PDN-GW) 313, a home Policy and Charging Rules Function (hPCRF) 314, a home Online Charging System (OCS) 315, and a notification server 316.

PCRF 314 and OCS 315 together form an integrated Diameter server referred to as a Policy and Charging Control Function (PCCF) 317. Additionally, PDN-GW 313 includes a Policy Control Enforcement Function (PCEF) 318. PCCF 317 interfaces with PCEF 318 via a Gx over Gy interface. PCCF 317 stores a subscriber account profile for an end user of mobile device 330, and also stores usage thresholds and a usage cap. PCCF 317 provides QoS throttling control and grants quotas to PCEF 318 either by push or pull methods via the Diameter Gx over Gy interface. PCEF 318 monitors usage of mobile device 330 for data services, and reports the data usage to PCCF 317. Based on the usage from PCEF 318, PCCF 317 identifies that the usage of mobile device 330 reaches a usage threshold based on the subscriber profile for the end user, and determines whether to perform QoS throttling based on policies defined for the end user. If the determination is to perform QoS throttling, then PCCF 317 identifies a reduced QoS and sends the reduced QoS to PCEF 318. PCEF 318 then enforces QoS throttling by downgrading the QoS for mobile device 330 based on the reduced QoS. PCCF 317 also controls notification server 316 to notify mobile device 330 that the QoS for mobile device 330 is reduced.

Visited PLMN 320 represents a network where the end user of mobile device 330 has no service plan, but yet extends service to mobile device 330 while roaming. Visited PLMN 320 includes a 3GPP access network 321 and an S-GW 322.

Non-3GPP network 340 includes a trusted non-3GPP access network 341 and an un-trusted non-3GPP access network 342.

Mobile device 330 is shown in FIG. 3 as communicating with both access network 311 and access network 321. This is merely to illustrate that mobile device 330 may be accessing home PLMN 310 or may be roaming in visited PLMN 320.

Figure 4:
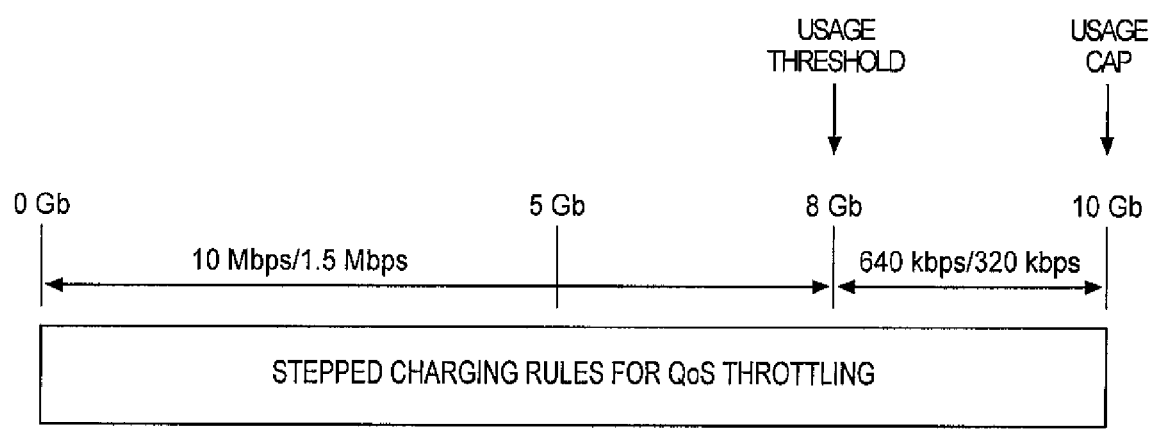
FIG. 4 illustrates stepped charging rules as stored by a PCCF in a subscriber account in an exemplary embodiment.

FIG. 4 illustrates stepped charging rules as stored by PCCF 317 in a subscriber account in an exemplary embodiment. In this example, the end user of mobile device 330 has a usage cap of 10 Gigabytes (Gb) during a billing period, such as 1 month. In other words, the end user is able to send/receive 10 Gigabytes for data services during the billing period. After the usage cap is reached, data services may be terminated. Also, the end user has subscribed to a plan where the QoS guaranteed to the end user includes a downstream bit rate of 10 Mbps, and an upstream bit rate of 1.5 Mbps. These bit rates are merely examples of bit rates that are achievable in LTE/EPC networks.

The guaranteed QoS is provided to the end user until a usage threshold is reached, which is 8 Gigabytes in this example. When the usage threshold is reached, QoS throttling may be applied to downgrade the QoS to mobile device 130 for data services. With the downgraded QoS, the end user receives a downstream bit rate of 640 kbps, and an upstream bit rate of 320 kbps. This downgraded QoS is applied until the usage cap is reached or until the next billing period. If the usage cap is reached, data services may be terminated to mobile device 330 until the next billing period.

Figure 5:
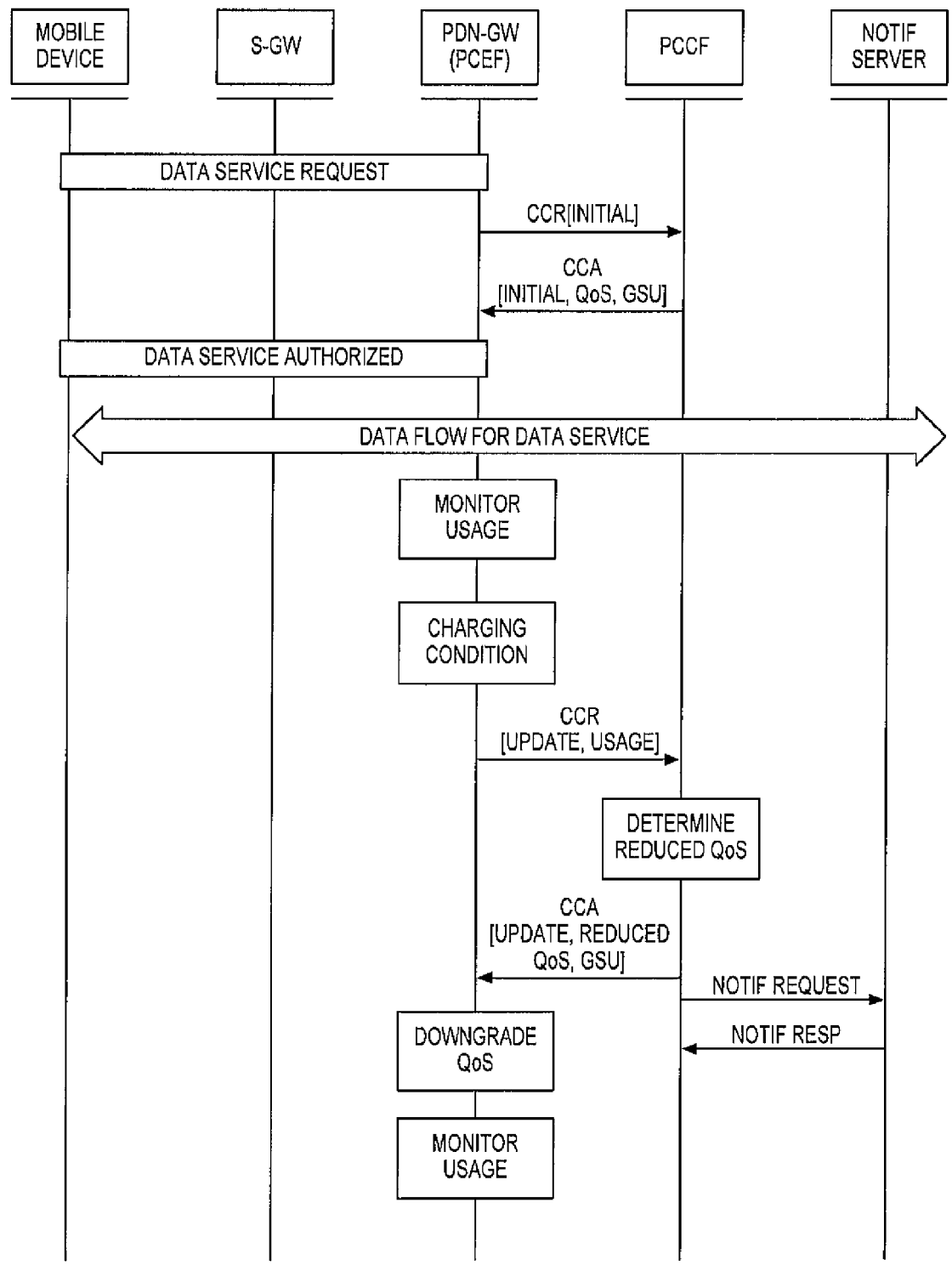
FIGS. 5-6 are message diagrams illustrating QoS throttling in an LTE/EPC network in an exemplary embodiment.
Figure 6:
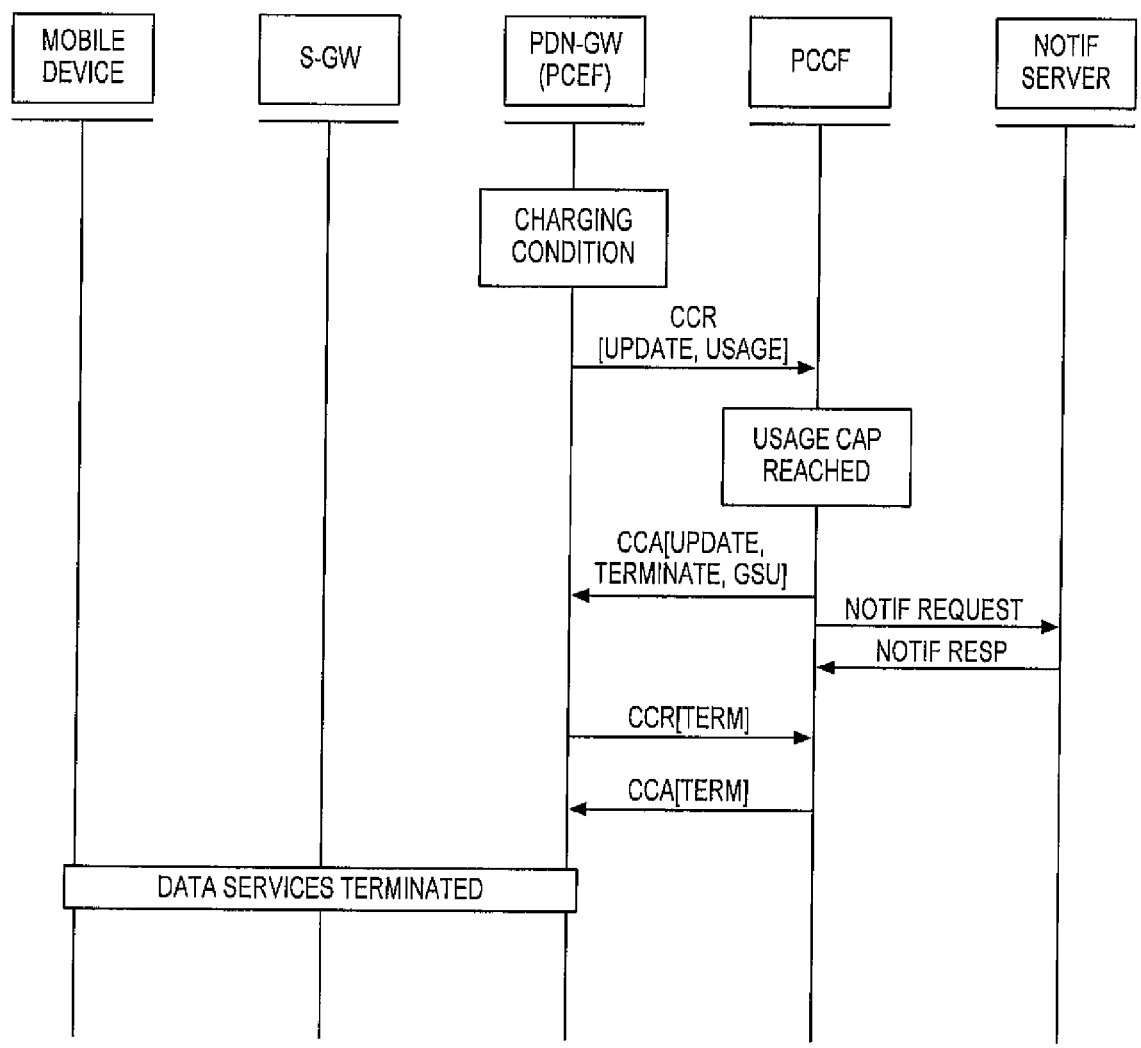

FIGS. 5-6 are message diagrams illustrating QoS throttling in LTE/EPC network 300 in an exemplary embodiment. The message diagrams illustrate Diameter messaging used within LTE/EPC network 300. To start in FIG. 5, mobile device 330 exchanges messages with PDN-GW 313 to request a data service. For example, mobile device 330 may send a SIP message, such as a SIP INVITE, to request the data service. In response to the data service being requested, PCEF 318 sends a Gx+y Credit Control Request (CCR)[INITIAL] to PCCF 317 requesting authorization for the service, a quota of service units, and an authorized QoS.

In response to the CCR, PCCF 317 identifies the mobile device 330 for the data service, and identifies the subscriber profile for the end user of mobile device 330. The subscriber profile for the end user indicates a QoS that is guaranteed to mobile device 330 for data services. PCCF 317 also identifies an account balance for the end user, and rates the data service. If the account balance is too low, then PCCF 317 may reject the reservation request. However, if the account balance is sufficient, then PCCF 317 grants a quota of service units based on the rating and the account balance. PCCF 317 then inserts the granted service units (GSU) in a Gx+y Credit Control Answer (CCA)[INITIAL] along with the authorized QoS, and transmits the CCA[INITIAL] to PCEF 318. As shown in FIG. 4, the authorized QoS initially includes a downstream bit rate of 10 Mbps, and an upstream bit rate of 1.5 Mbps.

With the authorized QoS and granted service units, PCEF 318 indicates to mobile device 330 that the data service has been authorized. One or more data flows for the data service may then begin. As the data flow(s) continue, PCEF 318 monitors the usage of mobile device 330 (e.g., the number of bytes received/transmitted) at the initial QoS.

Assume that PCEF 318 encounters a charging condition based on charging rules provided by PCCF 317. Responsive to the charging condition, PCEF 318 sends a charging request, such as a CCR[UPDATE], to PCCF 317. The CCR[UPDATE] includes a report of the usage of mobile device 330. In response to the CCR[UPDATE], PCCF 317 identifies that the usage of mobile device 330 reaches a usage threshold. For example, assume that the usage threshold of 8 Gigabytes has been reached during a billing period (see FIG. 4). With the usage threshold reached, PCCF 317 determines whether to perform QoS throttling. The determination of whether to perform QoS throttling may be performed based on policies defined for mobile device 330 or for LTE/EPC network 300 that are stored in PCCF 317. Some examples of the policies were described above. If the determination is to perform QoS throttling, then PCCF 317 determines a reduced QoS for mobile device 330. For example, the reduced QoS includes a downstream bit rate of 640 kbps, and an upstream bit rate of 320 kbps. PCCF 317 may also grant a new quota of service units for the data service if needed.

PCCF 317 then inserts the reduced QoS and any granted service units (GSU) in a charging response, such as a Gx+y CCA[UPDATE], and transmits the CCA[UPDATE] to PCEF 318. PCEF 318 then downgrades the QoS provided to mobile device 330 for the data service based on the reduced QoS, and continues to monitor the usage of mobile device 330 at the downgraded QoS. PCCF 317 also sends a request to notification server 316 requesting that a notification be sent to mobile device 330 that the QoS has been downgraded.

Assume in FIG. 6 that PCEF 318 encounters another charging condition. Responsive to the charging condition, PCEF 318 sends another CCR[UPDATE] to PCCF 317. The CCR[UPDATE] includes a report of the usage of mobile device 330. In response to the CCR[UPDATE], PCCF 317 identifies that the usage of mobile device 330 reaches the usage cap (10 Gigabytes). With the usage cap reached, PCCF 317 determines whether to terminate data services to mobile device 330. The determination of whether to terminate data services may be performed based on policies defined for mobile device 330 or for LTE/EPC network 300 that are stored in PCCF 317. Some examples of the policies were described above. If the determination is to terminate data services, then PCCF 317 inserts an indication in a Gx+y CCA[UPDATE] that data services are terminated. PCCF 317 also inserts a quota of service units equal to zero (GSU=0) in the CCA, and transmits the CCA[UPDATE] to PCEF 318. PCCF 317 also sends a request to notification server 316 requesting that a notification be sent to mobile device 330 that data services have been terminated.

In response to the CCA[UPDATE] indicating that data services are terminated, PCEF 318 sends a CCR[TERMINATION] to PCCF 317. The CCR[TERMINATION] includes any unused service units. PCCF 317 responds with a CCA[TERMINATION], and PCEF 318 terminates data services to mobile device 330.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the invention is not limited to those specific embodiments. The scope of the invention is defined by the following claims and any equivalents thereof.

What is claimed is:

1. A network element, comprising:
one or more processors configured to execute, and a memory having stored thereon, computer-executable instructions which when executed by the one or more processors cause the network element to perform at least:
monitoring usage of a mobile device that is accessing data services;
identifying that the usage of the mobile device reaches a first usage threshold, which is lower than a data usage cap for a predefined time period, and determining a reduced Quality of Service (QoS) responsive to reaching the first usage threshold, thereby postponing data service termination through the end of the predefined time period; and
downgrading the QoS provided to the mobile device for data services based on the reduced QoS prior to reaching the data usage cap.

2. The network element of claim 1 wherein the one or more processors are further configured to:
send a notification to the mobile device that the QoS is reduced.

3. The network element of claim 1 wherein the one or more processors are further configured to:
monitor usage of the mobile device at the reduced QoS;
identify that the usage of the mobile device reaches a second usage threshold, and to determine an additionally reduced QoS responsive to reaching the second usage threshold; and
downgrade the QoS provided to the mobile device for data services based on the additionally reduced QoS.

4. The network element of claim 3 wherein the one or more processors are further configured to:
send a notification to the mobile device that the QoS is additionally reduced.

5. The network element of claim 1 wherein the one or more processors are further configured to:
identify that the usage of the mobile device reaches a usage cap, and to determine that data services to the mobile device be terminated responsive to reaching the usage cap; and
terminate data services to the mobile device responsive to the determination that data services be terminated.

6. The network element of claim 5 wherein the one or more processors are further configured to:
send a notification to the mobile device that the data services are terminated.

7. The network element of claim 1 wherein the one or more processors are further configured to:
determine a reduced QoS by determining a reduced bit rate for the mobile device for data services.

8. A method of performing Quality of Service (QoS) throttling, the method comprising:
monitoring, by a network element, usage of a mobile device that is accessing data services;
identifying, by the network element, that the usage of the mobile device reaches a first usage threshold, which is lower than a data usage cap for a predefined time period; determining, by the network element, a reduced QoS responsive to reaching the first usage threshold, thereby postponing data service termination through the end of the predefined time period; and
downgrading, by the network element, the QoS provided to the mobile device for data services based on the reduced QoS prior to reaching the data usage cap.

9. The method of claim 8 further comprising:
sending, by the network element, a notification to the mobile device that the QoS is reduced.

10. The method of claim 8 further comprising:
monitoring, by the network element, usage of the mobile device at the reduced QoS;
identifying, by the network element, that the usage of the mobile device reaches a second usage threshold;
determining, by the network element, an additionally reduced QoS responsive to reaching the second usage threshold; and
downgrading, by the network element, the QoS provided to the mobile device for data services based on the additionally reduced QoS.

11. The method of claim 10 further comprising:
sending, by the network element, a notification to the mobile device that the QoS is additionally reduced.

12. The method of claim 8 further comprising:
identifying, by the network element, that the usage of the mobile device reaches a usage cap;
determining, by the network element, that data services to the mobile device be terminated responsive to reaching the usage cap; and
terminating, by the network element, data services to the mobile device responsive to the determination that data services be terminated.

13. The method of claim 12 further comprising:
sending, by the network element, a notification to the mobile device that the data services are terminated.

14. The method of claim 8 wherein determining a reduced QoS comprises:
determining, by the network element, a reduced bit rate for the mobile device for data services.

15. An LTE/EPC network, comprising:
one or more processors configured to execute, and a memory having stored thereon, computer-executable instructions which when executed by the one or more processors cause the network to perform at least:
monitoring usage of a mobile device that is accessing data services at an initial QoS;
receiving a charging request from a Policy Control Enforcement Function (PCEF) indicating usage of the mobile device, identifying that the usage of the mobile device has reached a usage threshold, which is lower than a data usage cap for a predefined time period, to determining a reduced Quality of Service (QoS) via which data service termination is postponed through the end of the predefined time period for the mobile device, and sending a charging response to the PCEF indicating the reduced QoS; and
downgrading the initial QoS for the mobile device based on the reduced QoS prior to reaching the data usage cap.

16. The LTE/EPC network of claim 15 wherein the one or more processors are further configured to:
transmit a request to a notification server to send a notification to the mobile device indicating the reduced QoS.

17. The LTE/EPC network of claim 15 wherein the one or more processors are further configured to:
monitor the usage of the mobile device at the reduced QoS;
receive another charging request from the PCEF indicating the usage of the mobile device, to identify that the usage of the mobile device has reached a usage cap, and to send another charging response to the PCEF indicating service termination; and
terminate data services to the mobile device based on the other charging response.

18. The LTE/EPC network of claim 17 wherein the one or more processors are further configured to:
transmit a request to a notification server to send a notification to the mobile device indicating that data services are terminated.

19. The LTE/EPC network of claim 15 wherein:
the charging request comprises a Gx+y Credit Control Request (CCR); and
the charging response comprises a Gx+y Credit Control Answer (CCA).

20. The LTE/EPC network of claim 15 wherein the one or more processors are further configured to:
determine a reduced QoS by determining a reduced bit rate for the mobile device for data services.

* * * * *